United States Patent

[11] 3,554,106

| | | |
|---|---|---|
| [72] | Inventor | Aaron Baumgarten<br>San Mateo County, Calif. |
| [21] | Appl. No. | 663,586 |
| [22] | Filed | Aug. 28, 1967 |
| [45] | Patented | Jan. 12, 1971 |
| [73] | Assignee | Hycon Mfg. Company<br>Monrovia, Calif. |

[54] SHUTTER DEVICE
1 Claim, 3 Drawing Figs.

[52] U.S. Cl. .................................................. 95/57
[51] Int. Cl. .................................................. G03b 9/28
[50] Field of Search ......................................... 95/57

[56] References Cited
UNITED STATES PATENTS

| 2,417,482 | 3/1947 | Gacki .................. | 95/57 |
| 2,512,815 | 6/1950 | Svensson ............... | 95/57 |
| 2,907,256 | 10/1959 | Doyle .................. | 95/57 |
| 3,138,083 | 6/1964 | Thomas ................. | 95/57 |

Primary Examiner—John M. Horan
Assistant Examiner—Richard L. Moses
Attorney—Golove & Kleinberg ABSTRACT: Focal plane shutter apparatus having a shutter slit which is adjustable from a remote location. A pair of shutter curtains is utilized to form the shutter slit, and a transmission mechanism is controlled to drive the curtains simultaneously at the same speed and alternatively at different relative speeds.

Aaron Baumgarten,
INVENTOR.
BY
GOLOVE & KLEINBERG,
ATTORNEYS.

Aaron Baumgarten,
INVENTOR.
BY.

GOLOVE & KLEINBERG,
ATTORNEYS.

SHUTTER DEVICE

The present invention relates to cameras, and more particularly to means for driving the shutter which controls the exposure of the film.

There are a wide variety of photographic cameras for exposing a light-sensitive film to form a latent image thereon. The duration of the exposure is controlled by a shutter which is normally maintained closed, thereby preventing light from reaching the film. When an exposure is made the shutter is momentarily opened for a predetermined time interval. The amount of the exposure is controlled by the duration of the interval that the shutter is open.

One common type of shutter frequently employed for this purpose is the so-called "focal plane" shutter. Such a shutter employs one or more opaque curtains which are disposed substantially in the focal plane and immediately adjacent the film. The ends of the two curtains are closely spaced but separated from each other by a small distance whereby an open slit is formed. When the two curtains are drawn across the front of the film this slit is also moved across the film. This allows a narrow band of the image-forming light to travel across the film and to expose the film.

If the speed at which the curtains travel is constant and the slit width is constant, then the exposure is constant. The duration of the exposure is a function of the width of the slit and the velocity at which the curtain travels. Accordingly, by moving one of the curtains relative to the other curtain, the width of the slit may be varied, controlling the duration of the exposure even though the curtains are always driven at a constant speed.

Many different types of drive means have been proposed in the prior art for driving the curtains across the face of the film and for controlling the size of the slit. However, in spite of a considerable amount of time and effort being devoted to the development of satisfactory focal plane shutters, it is still extremely difficult, if not impossible, to make a simple focal plane shutter capable of providing an accurate exposure.

The simplest and most accurate drive mechanisms simultaneously move both of the curtains at a constant speed. Since the two curtains are operatively coupled together it has been necessary to provide some form of release in the drive mechanism to permit one or both of the curtains to be moved when the width of the slit is to be adjusted. This, however, tends to complicate the drive mechanism. Moreover, once the drive mechanism has been actuated and the curtains are in motion it has been very difficult to modify the size of the slit, without interrupting the motion, to vary the exposure in all or particular portions of the image. It may thus be seen that prior art types of focal plane shutters have not been entirely satisfactory.

The present invention provides means for overcoming the foregoing disadvantages and limitations. More particularly the present invention provides a focal plane shutter and drive mechanism therefor, which are simple and reliable and yet permit the motion of the curtains and the size of the slit therebetween to be varied independently of each other. In addition, the means provided permits varying the width of the slit whereby the magnitude of the exposure may be varied in different regions of the image.

In the embodiment of the present invention disclosed herein, this is accomplished by providing a pair of curtains mounted on separate drums or rollers that support the curtains and allows them to be transported across the focal plane. The drive mechanism includes an epicyclic drive train that is coupled to the drums or rollers for driving them simultaneously. The epicyclic drive train also includes a pair of separate inputs that are coupled to a pair of separate drive motors.

If the first drive motor is operated and the second drive motor retains the second input fixed, the two curtains more relative to each other whereby the width of the slit is varied to the desired size. If the second drive motor drives the second input and the first drive motor retains the first input fixed, both curtains are simultaneously transported in the same direction at the same speed whereby the slit will move across the film and a uniform exposure is made.

Either of the two inputs may be driven without effecting the other and it is no longer necessary to provide any sort of a release. If, for any reason it is desired to vary the amount of the exposure in different portions of a picture, the two inputs may be operated simultaneously. The effective speed at which the slit is travelling will remain constant but, the width of the slit can be varied to increase or decrease the exposure of certain areas of the image.

These and other features and advantages of the present invention will become readily apparent from the following detailed description of a single embodiment thereof, particularly when taken in connection with the accompanying drawings wherein like reference numerals refer to like parts.

Figure 1:
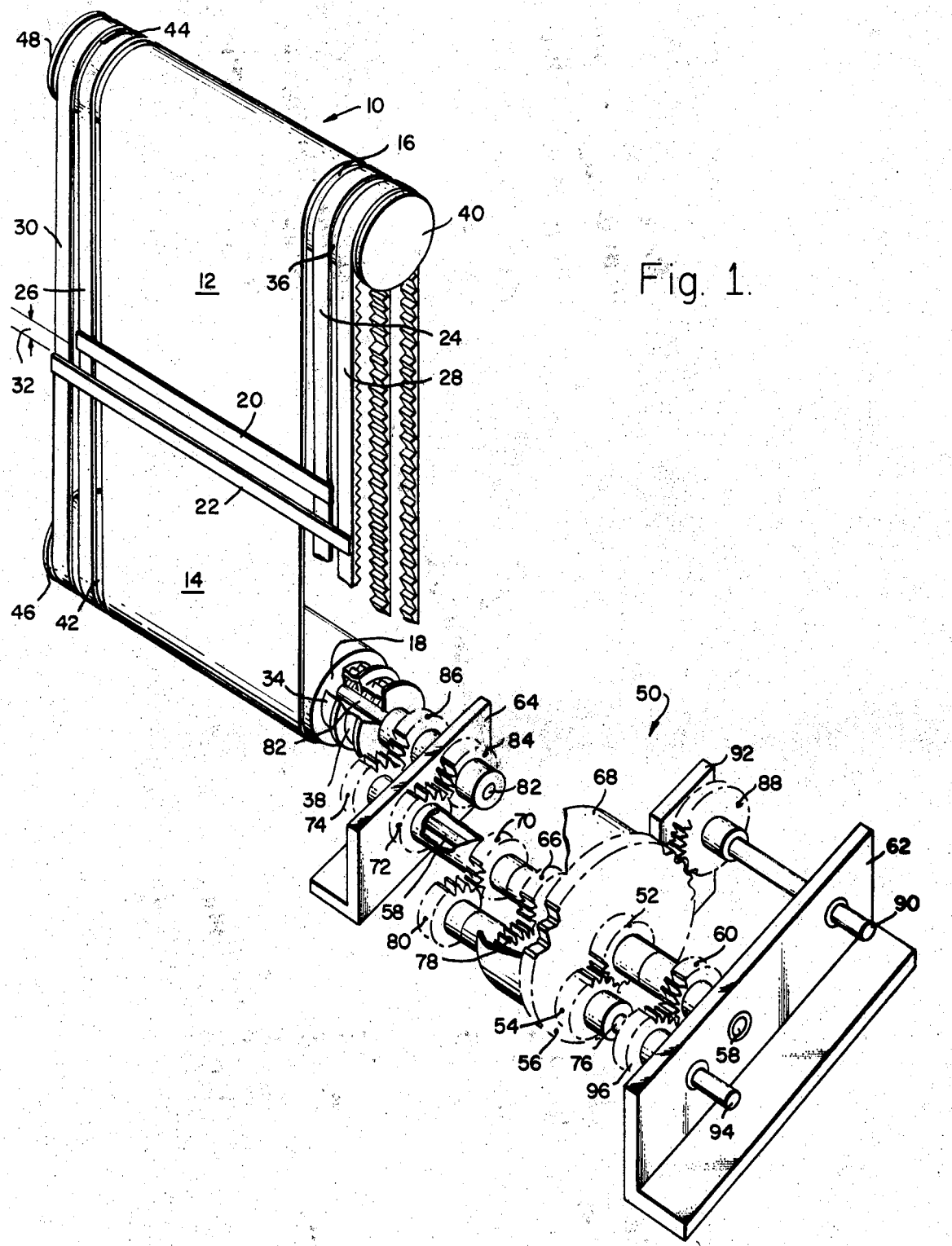
FIG. 1 is a perspective view of a preferred embodiment of adjustable shutter apparatus according to the present invention.

Turning to FIG. 1, a shutter 10 is adapted to be positioned immediately adjacent to a photographic film surface for traversing the focal plane of a camera. The shutter 10 includes a first curtain 12 and a second curtain 14, which may be of any desired type of material but are normally made from a relatively thin, flexible material which is completely impervious to light.

In this example of a focal plane shutter, the first curtain 12 is adapted to be rolled around a first idler roller 16, and the second curtain 14 is adapted to be rolled around a second idler roller 18. A free edge of the first curtain 12 is attached to a first bar member 20, while a free edge of the second curtain 14 is attached to a second bar member 22. The ends of the first bar member 20 are attached to a first pair of endless belts 24, 26, while the ends of the second bar member 22 are attached to a second pair of endless belts 28, 30. Each of the endless belts are positioned in the camera so that when they are caused to move, the bar members 20, 22 will traverse the camera focal plane. The bar members 20, 22 are positioned parallel to each other, and the separation between them describes a shutter slit 32.

The first endless belt 24 is driven by a first drive pulley 34 and is further looped around a first idler pulley 36. Similarly, the second endless belt 28 is driven by a second drive pulley 38 and is further looped around a second idler pulley 40. The third endless belt 26 is looped around a third idler pulley 42 and a fourth idler pulley 44, while the fourth endless belt 30 is looped about a fifth idler pulley 46 and a sixth idler pulley 48.

It can be readily seen from the drawing that when the first and second endless belts 24, 28 are simultaneously drive in the same direction and at the same speed by the first and second driving pulleys 34, 38, the bar members 20, 22 will be transported in the same direction and at the same speed across the camera focal plane. Under these conditions, the bar members 20, 22 maintain a uniform separation, and the shutter slit 32 traverses the camera focal plane.

If, however, the driving pulleys 34, 38 rotate in opposite directions, the separation between the bar members 20, 22 will change, so that the shutter slit 32 can be varied as desired. Furthermore, the driving pulleys 34, 38 can be made to rotate in the same direction but at different speeds, so that the width of the shutter slit 32 can be varied with respect to different locations throughout the camera focal plane, allowing the shutter to vary the amount of exposure for different portions of a photograph.

Figure 2:
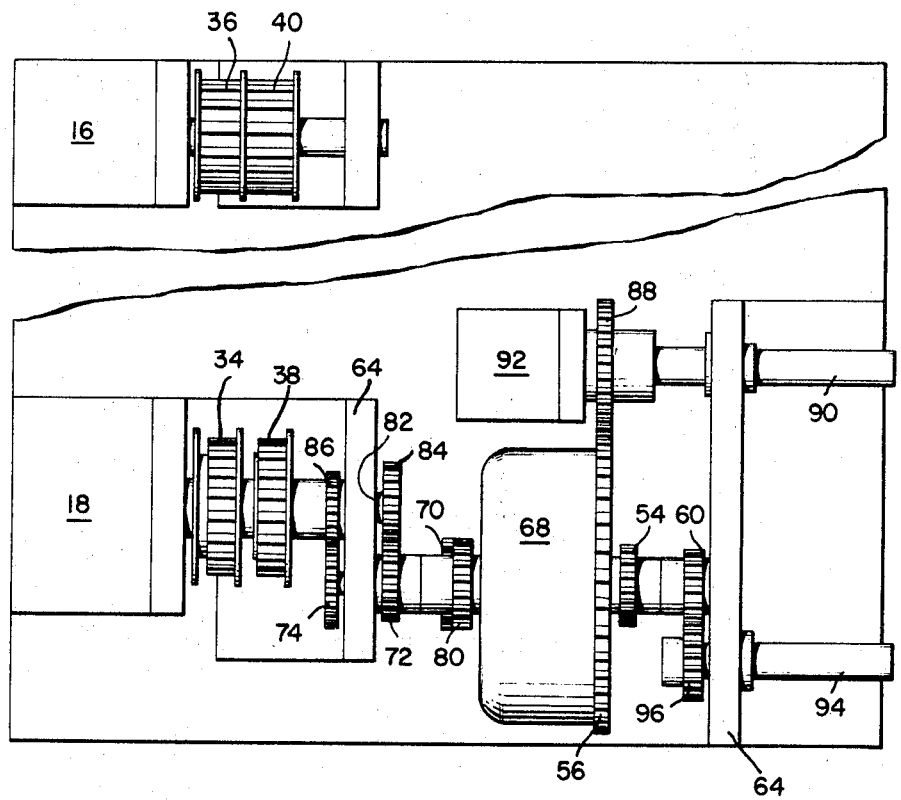
FIG. 2 is a plan view of a drive transmission of the shutter apparatus of FIG. 1.
Figure 3:
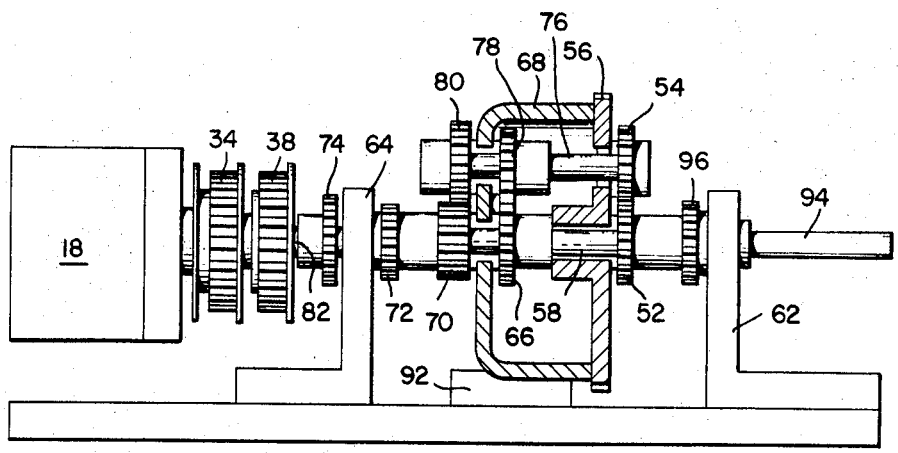
FIG. 3 is a side view, partially in cross section, of the drive transmission shown in FIG. 2.

This structure and operation of a drive transmission 50 for rotating the first and second drive pulleys 34, 38 may be best described by concurrent consideration of FIGS. 1, 2 and 3. The transmission 50 includes an epicyclic train of spur gears having a first "sun" gear 52 and a first "planetary" gear 54, and the first planetary gear 54 is constrained by a "spider"

gear 56 to move bodily around the effective circumference of the first sun gear 52.

The first sun gear 52 is rotatably mounted on a first shaft 58, and is rigidly coupled to a first sun drive gear 60 rotatably mounted on the first shaft 58. The first shaft 58 is rotatably mounted along a fixed axis, for example by coupling the first shaft 58 to a pair of brackets 62, 64 through appropriate bearings.

A second sun gear 66 is rigidly mounted on the first shaft 58, and is located within a spider box 68. A third sun gear 70 is rotatably mounted on the first shaft 58, and is rigidly coupled to a first drive transmission gear 72 which is also rotatably mounted on the first shaft 58. A second drive transmission gear 74 is rigidly mounted on the first shaft 58.

The first planetary gear 54 is rotatably positioned on the spider gear 56, and is in continual engagement with the first sun gear 52. The first planetary gear 54 is further rigidly mounted on a second shaft 76 which is positioned parallel to the first shaft 58 and which is adapted to rotate about the first shaft 58. A second planetary gear 78 is rigidly mounted to the second shaft 76, and is located within the spider box 68 for continual engagement with the second sun gear 66. Similarly, a third planetary gear 80 is rigidly mounted on the second shaft 76 and is in continual engagement with the third sun gear 70.

The first drive pulley 34 is rigidly mounted on a third shaft 82 which is positioned along a fixed axis parallel to the first shaft 58. A first pulley drive gear 84 is rigidly mounted on the third shaft 82, for continual engagement with the first drive transmission gear 72. The second drive pulley 38 is rigidly coupled to a second pulley drive gear 86, both of which are rotatably mounted on the third shaft 82. The second pulley drive gear 86 is positioned for continual engagement with the second drive transmission gear 74.

The transmission 50 can be operated to simultaneously rotate the drive pulleys 34, 38 in the same direction and at the same speed (for transporting a constant width shutter slit 32), to simultaneously rotate the drive pulleys at the same speed but in opposite directions (for adjusting the width of the shutter slit 32), and to simultaneously rotate the drive pulleys in the same direction but at different controlled speeds (for traversing a shutter slit 32 of varying width). These operations are controlled by the amount of relative rotation applied to the spider gear 56 and the sun drive gear 60.

Controlled rotation may be applied to the spider gear 56 by providing a spider drive gear 88 which is in continual engagement with the spider gear 56. The spider drive gear 88 may be rigidly mounted on a fourth shaft 90, positioned parallel to the first shaft 58 and rotatably mounted to the first bracket 62 and a third bracket 92. Drive means, such as a first motor (not shown), may be coupled to the fourth shaft 90.

Rotation of the sun drive gear 60 can be controlled by coupling drive means thereto, such as by utilizing a second motor (not shown) for rotating a fifth shaft 94. The fifth shaft 94 is rotatably supported by the first bracket 62, and is positioned parallel to the first shaft 58. A sun drive transmission gear 96 is rigidly mounted on the fifth shaft 94 and is in continual engagement with the sun drive gear 60, for transmitting rotation from the second motor to the sun drive gear 60.

When it is desired to transport the shutter slit 32 of constant width, the first motor acts as a brake to prevent rotation of the spider gear 56, and the second motor is caused to rotate the sun drive transmission gear 96 which transmits rotation to the sun drive gear 60. For example, if the sun drive transmission gear 96 is caused to rotate in a clockwise direction as shown in the drawing, the sun drive gear 60 will rotate in the counterclockwise direction. Since the sun gear 52 is rigidly coupled to the sun drive gear 60 and rotatably coupled to the spider gear 56, the sun gear will rotate in the counterclockwise direction. Such rotation of the sun gear 52 will cause the first planetary gear 54 to rotate in a clockwise direction, and since the second shaft 76 is rigidly coupled to the second planetary gear 78 and to the third planetary gear 80 as well as to the first planetary gear 54, both the second and third planetary gears will rotate in a clockwise direction.

This rotation of the second planetary gear 78 causes the second sun gear 66, which is pinned to the first shaft 58, to rotate in a counterclockwise direction, causing corresponding rotation of the first shaft 58. The second drive transmission gear 74 thereupon rotates in the counterclockwise direction, causing clockwise rotation of the second pulley drive gear 86. Since this last mentioned gear is rigidly coupled to the second drive pulley 38, the second drive pulley is caused to rotate in a clockwise direction.

The clockwise rotation of the third planetary gear 80 produces counterclockwise rotation of the third sun gear 70. The resulting rotation of the first drive transmission gear 72 is transmitted to the first drive pulley gear 84 which rotates in the clockwise direction. Since this last mentioned is rigidly mounted on the third shaft 82, and the third shaft is rigidly coupled to the first drive pulley 34, the first drive pulley 34 is caused to rotate in the clockwise direction.

Both of the drive pulleys 34, 38, therefore, are caused to rotate simultaneously in the clockwise direction. If desired, both of the drive pulleys 34, 38 can be caused to rotate simultaneously in the counterclockwise direction by applying counterclockwise rotation to the sun drive transmission gear 96 by the second motor. In either case, the angular velocities of the first and second drive pulley gear 84, 86 must be identical in order to provide identical speeds to the drive pulleys 34, 38. This is accomplished by appropriate design of the individual spur gears included in the transmission 50, by techniques which are well known to the transmission art.

When it is desired to adjust the width of the shutter slit 32, the second motor acts as a brake to prevent rotation of the sun drive gear 60, and the first motor is caused to rotate the spider gear 56 by rotating the spider drive gear 88. For example, if the spider drive gear 88 is caused to rotate in a clockwise direction as shown in the drawing, the spider gear 56 will rotate in a counterclockwise direction. The first planetary gear 54 rotates epicyclically counterclockwise with respect to the first sun gear 52, which is held stationary. Corresponding rotation is thereupon transmitted to the second planetary gear 78 and to the third planetary gear 80.

The epicyclic counterclockwise rotation of the second planetary gear 78 produces counterclockwise rotation of the second sun gear 66. Since this latter gear is rigidly mounted on the first shaft 58, the second drive transmission gear 74 rotates in a corresponding counterclockwise direction to produce clockwise rotation of the second drive pulley gear 86, causing the attached second drive pulley 38 to rotate in the clockwise direction.

The epicyclic counterclockwise rotation of the third planetary gear 80 produces clockwise rotation of the third sun gear 70, causing the first drive transmission gear 72 to rotate in a clockwise direction. Counterclockwise rotation is thereupon produced in the first pulley drive gear 84, causing the first drive pulley 34 to rotate in the counterclockwise direction.

The drive pulleys 34, 38, therefore, are caused to rotate simultaneously in opposite directions which, in the case described, causes the width of the shutter slit 32 to decrease. Alternatively, the width of the shutter slit can be caused to increase by applying counterclockwise rotation to the spider drive gear 88 by the first motor.

If desired, a shutter slit 32 of varying width can be controlled to traverse the camera focal plane. This condition is accomplished by operating both the first and second motors simultaneously, but controlled separately, to ultimately rotate the drive pulleys 34, 38 in the same direction but at varying speeds. In this manner, the amount of exposure for different portions of a photograph can be varied.

Thus, there has been shown a preferred embodiment of a focal plane shutter having an adjustable exposure slit, including means for causing the shutter slit to traverse a predetermined plane as well as means for adjusting the width of the shutter slit. Other embodiments of the present invention and modifications of the embodiment herein presented, may be developed without departing from the essential characteristics thereof.

Accordingly, the invention should be limited only by the scope of the claims appended below.

I claim:

1. A camera shutter comprising the combination of:
a. a curtain transport;
b. a first curtain mounted on the transport;
c. a second curtain mounted on the transport adjacent to said first curtain, said curtains having a pair of juxtaposed ends positioned adjacent to each other to form an opening therebetween, the size of said opening being determined by the relative positions of said curtains:
d. drive means including a single driving mechanism and an epicyclic train;
e. a pair of inputs to said train;
f. a pair of outputs to said train, one of said outputs being coupled to one of said curtains and the other of said outputs being coupled to one of said curtains and the other of said outputs being coupled to the other of said curtains;
g. first drive means coupled to one of said inputs for simultaneously driving both of said curtains in the same direction; and
h. second drive means coupled to the other of said inputs for driving at least one of said curtains relative to the other of said curtains.